April 29, 1947.  H. M. ROGERS  2,419,658
DEMONSTRATING DEVICE
Filed May 8, 1945
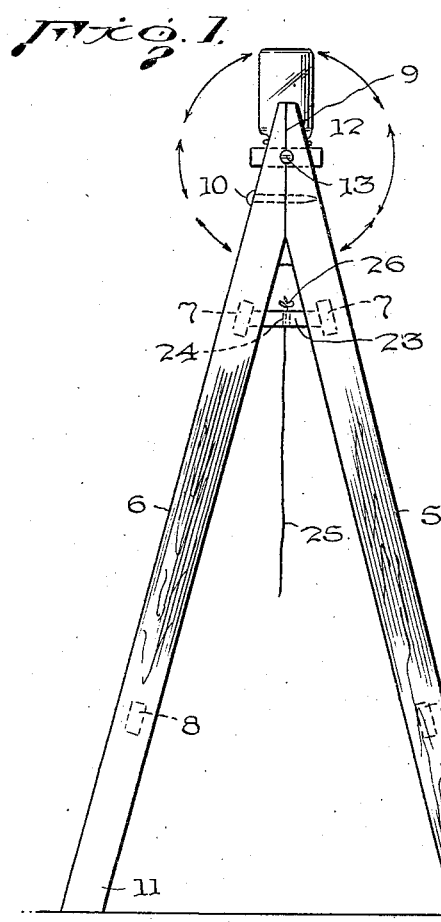
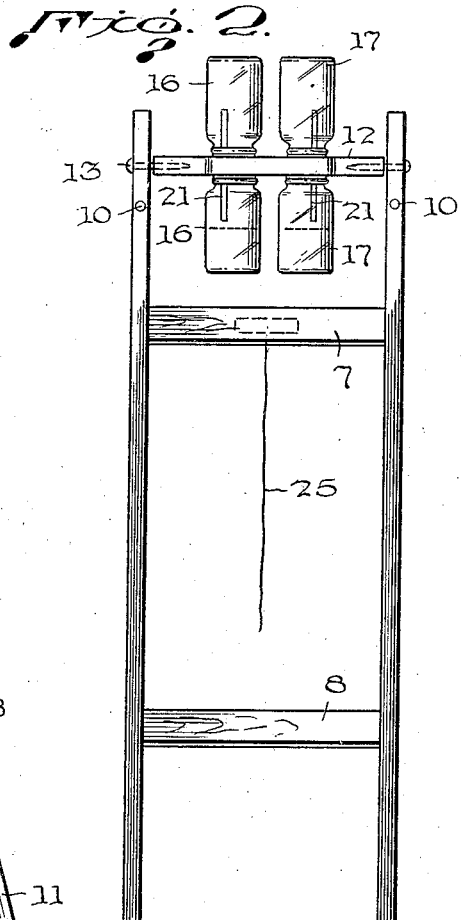
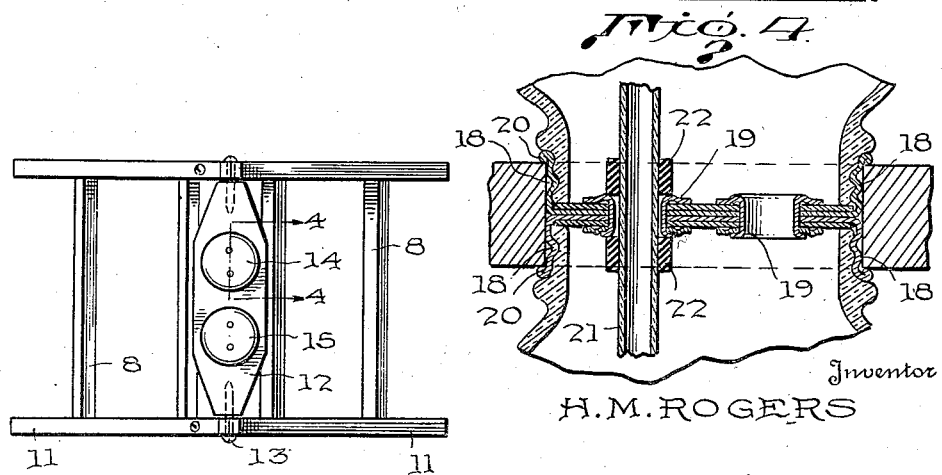
Inventor
H. M. ROGERS Patented Apr. 29, 1947

2,419,658

UNITED STATES PATENT OFFICE 2,419,658

DEMONSTRATING DEVICE

Hiram M. Rogers, Springfield, Mass., assignor to Gulf Oil Corporation, Pittsburgh, Pa., a corporation of Pennsylvania Application May 8, 1945, Serial No. 592,683

5 Claims. (Cl. 35—50)

This invention relates to demonstrating devices and particularly to a merchandise display device or apparatus useful at automobile service stations, garages and the like to visually demonstrate to motorists why automobile crank case oil should be changed in cold weather from heavy summer oil to light winter oil, and vice versa.

Automobile engines have been improved in construction and design from heavy noisy inefficient motors to efficient powerful light weight engines which operate quietly and are of high precision machine work. In the development and use of these modern engines, lubrication plays a most important role, so important in fact that it is sometimes said that the engine is built around the lubricant. This means that it is desirable if not essential in order to obtain high efficiency and long engine life that the proper lubricating oil be used in the crank case.

As a practical matter it is comparatively easy for the manufacturer or dealer in automobiles to see to it that the proper lubricant is used in the engine as long as it is in their care but, once the car is sold the responsibility for its correct lubrication passes to the purchaser. Whether or not the purchaser continues to have the engine correctly lubricated depends largely upon his individual knowledge and appreciation of the fact that lubricating oils differ widely in certain respects.

A most important difference or quality of engine crankcase oil and one largely determining its adaptability for use in a particular engine is its viscosity or flow characteristic. Most engines today are pressure lubricated. Oil from a sump or reservoir is pumped under pressure through small passages to bearings surfaces remote from reservoir. Draining from these surfaces, the oil finds its way by gravity flow back to the reservoir. Tolerances and bearing clearances are kept low in the interests of efficiency and quiet operation. The lubricant must flow readily and yet have sufficient body to lubricate properly when subjected to the enormous pressures existing in some of the bearings of the engine.

If the oil is too light (i. e. of too low a viscosity) it is sometimes squeezed from between the bearing surfaces, and destructive frictional metal to metal contact occurs. Then again, when the engine is stopped light oil drains substantially completely from the bearings so that they are left with insufficient lubrication for the period when the engine is again started and oil from the pump has not had sufficient time to reach them. If on the other hand, the oil is too heavy (i. e. of too high a viscosity) the time required for it to reach the bearings is lengthened and although some oil may have remained on the bearings it is often insufficient to provide proper lubrication. Heavy oil becomes highly viscous at low temperatures and in cold weather it may be some time before it reaches the bearings.

Of course, most service station operators know this and are equipped to furnish the proper viscosity of oil when changes in the temperature of the weather are imminent. The motorist, however, because of a possible lack of knowledge or full realization and appreciation of the changes in viscosity of oil with comparatively small changes in temperature is apt to ignore, at least for a time, the fact that the oil in the crank case of his car should be changed. This can cause serious, premature wearing of the bearings of the engine.

Fortunately the viscosity of lubricating oil is a property that lends itself well for display purposes and when strikingly displayed is strongly persuasive and convincing of the importance it plays in securing correct lubrication. Heretofore many schemes have been devised for demonstrating the differences in the viscosities of crankcase oil. A few of these have at times reached the stage of limited public display but mostly, for practical reasons, their use has not ranged far beyond the laboratory or refiners' sales rooms. Many of these devices have consisted of complicated specially blown or designed, fragile glass receptacles, filled with oil and hermetically sealed by the maker. Sometimes the receptacles are evacuated of air for simplicity of operation and design. Other displays have consisted of open metal containers with spouts but these collect dust and dirt and in a short time are far from appealing to the motorist.

Among the objects of the present invention are the provisions of a merchandising device for displaying the viscosity of crankcase lubricating oil that is simple in construction and operation, inexpensive to build and readily adapted for wide distribution and use at the ordinary gasoline service station; the provision of such a device that may be operated by the prospective purchaser and ultimate user of the oil, such as the motorist; the provision of such a device that may be displayed advantageously out of doors, adjacent driveways of service stations, and the provision of a device of the character described that may be shipped dry in knockdown condition ready for quick easy assembly by the service station attendant. A further object of the invention is the provision of such a device that may be emptied and filled with different oils by the attendant to demonstrate, for instance, the difference in flow between new and used oils or between any two oils or other liquids. A further object of the invention is the provision of such a device that may be used to display advertising posters and information instructing motorists in the use of the oil.

The above objects and other objects are accomplished by the present invention as will be apparent from the following specification when read in connection with the accompanying drawings.

Referring to the drawings,

Figure 1 is a view in side elevation of the apparatus of the present invention with arrows indicating how the jars containing oils of different viscosities may be rotated to invert them;

Figure 2 is a front elevational view;

Figure 3 is a top plan view; and

Figure 4 is a sectional view taken along line 4—4 of Figure 3 in the direction of the arrows.

Referring to the drawings, wherein like numerals indicate similar parts throughout the several views, the device consists of a four-legged easel-like stand formed by two leg assemblies 5 and 6, respectively. The leg assemblies may be made of wood or metal or any other suitable rigid material and comprise upper and lower cross members 7 and 8, respectively, nailed, bolted or welded to the legs, ladder fashion, for holding them in spaced parallel relation. At their upper ends, the legs of each assembly are beveled as at 9 and secured together as with screws 10. This construction results in the lower ends 11 of the legs being spaced apart a sufficient distance to render the device stable against tipping when standing upright.

At the upper ends of the legs the easel supports a flat wooden yoke-like member 12 mounted for rotation on a horizontal axis by means of pivots or swivel-like connections 13. Advantageously the ends of the yoke members are beveled as shown in Figure 3 to avoid excessive contact and rubbing against the legs when the yoke is rotated. The yoke is adapted by means of circular holes 14 and 15, to support two pairs of glass jars as shown at 16 and 17, respectively, which are preferably of the same size and may be of a common type, such for instance as mayonnaise jars, provided with metal screw tops or covers 18. In mounting the jars on the yoke, the covers are press fitted, back to back, in the holes, from opposite sides of the yoke and are rigidly secured together by means of two spaced metal grommets 19 advantageously of the same size and located along the axis of rotation of the yoke as illustrated. When clamped by the grommets in this position, the circular beading 20 around the covers is brought into close frictional engagement with the sides of the holes. This prevents the covers from turning in the holes when the jars are later screwed into place.

Each pair of jar covers is provided with a glass tube 21 which extends through one of the grommets a distance equal to a little less than halfway into each of the jars in engagement with the respective covers. The tube is held in place by means of tight fitting oil-proof rubber or fiber bushings or collars 22 which are pushed on over the tube from each end and up into close engagement with the upper and lower faces of the grommet. The tube acts as an air vent between a pair of jars when the lower jar of a pair is half filled with oil and the jars inverted by rotating the yoke one-half of a revolution. Under such conditions the oil will flow from the upper jar downwardly through the opening in the grommet not fitted with the tube, while air in the lower jar is displaced upwardly through tube 21 into the upper jar.

To aid in holding the display rigid and to prevent shocks or strong winds from upsetting it when it is used out-of-doors, a centrally disposed horizontal cross brace 23 connects cross members 7—7. The cross brace may be nailed or screwed in place and is provided with a central opening 24 through which rope or heavy cord 25 is inserted and hangs downward. A knot 26 in the rope above the opening serves to prevent the upper end of the rope from being pulled through the opening. The lower end of the rope may be secured to any suitable anchorage such for instance as a heavy can of oil not shown.

In use light oil of say 10 S. A. E. viscosity is poured into the lower jar of one of the pairs of jars until it is slightly less than half full, and the lower jar of the other pair of jars is filled to the same degree with heavy oil of say 50 S. A. E. viscosity. The jars may be removed and replaced for this purpose by simply screwing and unscrewing them from the covers in the yoke. Concerning the amount of oil to be placed in each jar and the distance the glass tubes project into each jar, it is simply important to note that these factors be correlated so that during and upon inversion of the jars oil does not enter the glass tubes. By locating the vent tubes on the diametrical axis of rotation of the jars, the jars when slightly less than half full of oil may be inverted by turning in either direction without danger of oil entering the tubes.

After the device has been assembled as above described with the oil in the two lower jars, the assembly including the yoke is rotated 180° to invert the jars. At this time the light oil will flow freely and quickly through the unrestricted grommet in the covers separating it from the lower jar of its pair while the flow of heavy oil into its lower jar is slow. The difference in the viscosities or flow speeds of the two oils is strikingly and convincingly exhibited, especially in cold weather when the flow of heavy oil will be very much slower than the flow of the lighter oil. The upper jar containing the light oil will empty much faster although the grommetted openings in the cover partitions separating the upper from the lower jars are of the same diameters.

While only two pairs of jars are shown thereby limiting the device to comparing only two oils at one time, the device may be provided with as many jars as desirable and used to compare the rates of flow of several oils simultaneously.

If desired, an instruction or advertising placard, not shown, may be secured to the stand by nailing to the cross bars 7 and 8 and to the legs between the cross bars. This lends further rigidity to the device as well as improving its appearance and utility.

The device described is simple in construction and operation and inexpensive to build. It provides unique display of an important characteristic of lubricating oils and may be operated by the ordinary motorist. The device is effective in teaching the motorists the importance of using oils of the proper viscosity during cold and hot weather.

What I claim is:

1. A demonstrating device comprising a stand, a pair of separable visible indicator members each comprising a receptacle open at one end, with the open ends sealed in communication with each other, said receptacles being adapted to contain liquid and gas and arranged one over the other, to empty one into the other upon being inverted, means on the stand for supporting said members for rotation about a horizontal axis, partition means separating the receptacles and provided with a passage restricting flow between the same, and a tubular air vent extending through the partition means to a point about midway of each of said receptacles.

2. The subject of claim 1 wherein said tubular air vent is located on the axis of rotation, whereby the indicator members may be rotated in either direction without liquid being admitted into the vent tube.

3. A merchandise display device comprising a stand, a yoke member mounted for rotation on a horizontal axis on the stand, said member being provided with openings therethrough, a pair of registering open-mouth receptacles for each opening, means for detachably securing said receptacles over said openings to extend on opposite sides of the yoke member, a partition in each of said openings, said partitions each being provided with a tubular air vent adapted to extend about midway into one pair of registering receptacles, and each partition being also provided with a liquid discharge orifice whereby, upon inverting the corresponding receptacles of each pair by rotating the yoke member, liquid may flow downwardly through the discharge orifices from the upper receptacles into the lower receptacles and air in the lower receptacles may be displaced upwardly through the respective tubular vents into the upper receptacles.

4. A merchandise display device comprising a stand, a member carried by the stand and adapted for rotation about a horizontal axis, a plurality of pairs of containers, detachable covers for each such pair, said covers being arranged back to back on the member to support one of the containers of each such pair on one side of the member and the other container of each such pair on the opposite side of the member, the two being thereby secured in vertical alignment, said covers being provided with a restricted opening for liquid transfer from one container to the other of each pair and an air vent tube extending through the covers into each container whereby air displaced from one container of a pair may pass into the other container of that pair.

5. The subject matter of claim 4 wherein the rotatable member carried by the stand is provided with an opening therethrough, flanges on said container covers, and means for clamping the container covers together back to back in the opening whereby said flanges are held in tight frictional engagement with the member about said opening.

HIRAM M. ROGERS.

REFERENCES CITED

The following references are of record in the file of this patent:

UNITED STATES PATENTS

| Number | Name | Date |
|---|---|---|
| 1,921,692 | Morgan | Aug. 8, 1933 |
| 1,866,105 | Heisenfeldt | July 5, 1932 |
| 1,021,229 | Baldus | Mar. 26, 1912 |
| 1,603,028 | Crimmel | Feb. 13, 1913 |
| 1,266,149 | Penniman | May 14, 1918 |
| 1,124,543 | Spears | Jan. 12, 1915 |
| 1,670,002 | Pferdmenges | May 15, 1928 |
| 2,110,237 | Parsons | Mar. 8, 1938 |
| 2,048,966 | Perry | July 28, 1936 |

FOREIGN PATENTS

| Number | Country | Date |
|---|---|---|
| 309,388 | German | 1918 |